Patented June 3, 1930

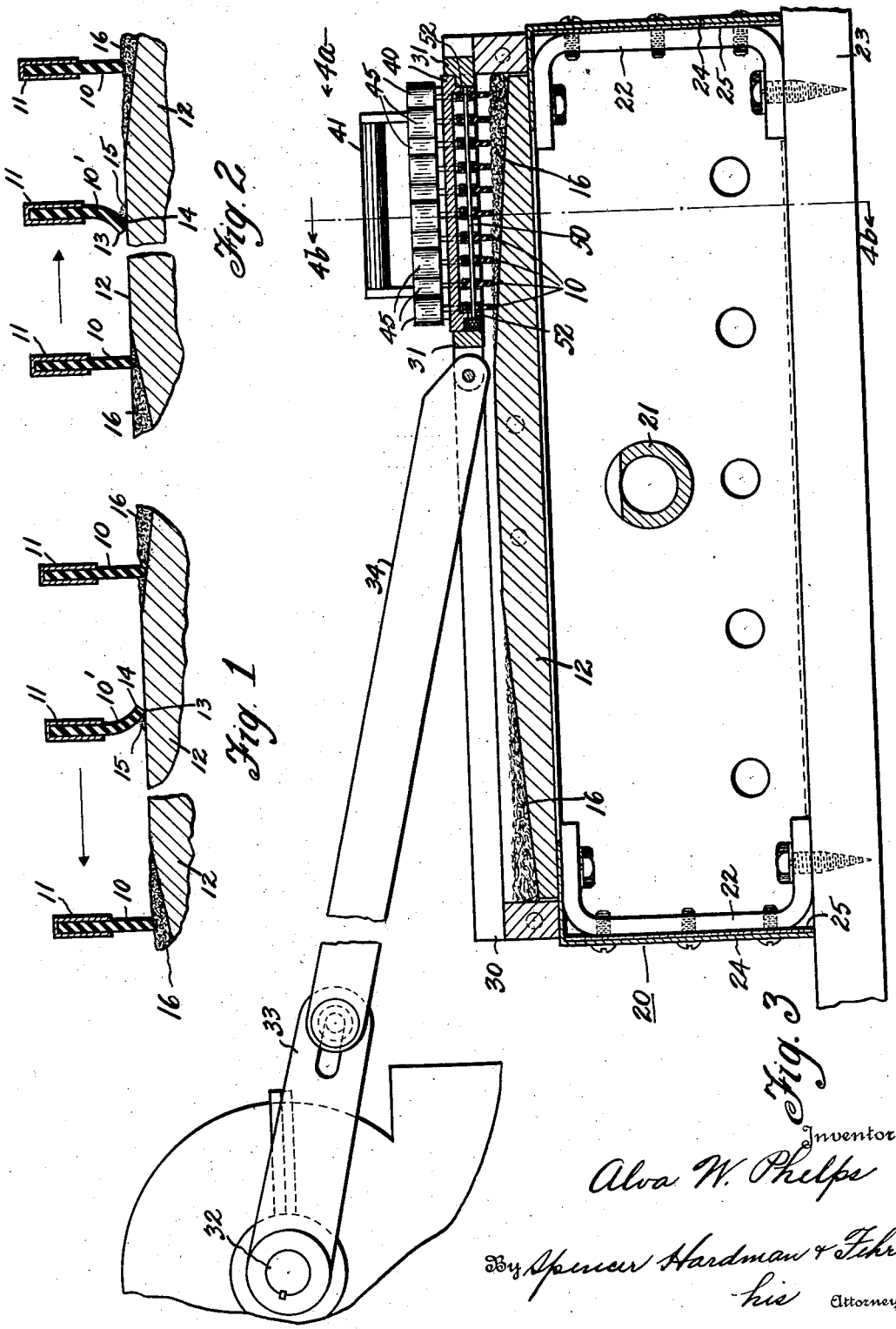

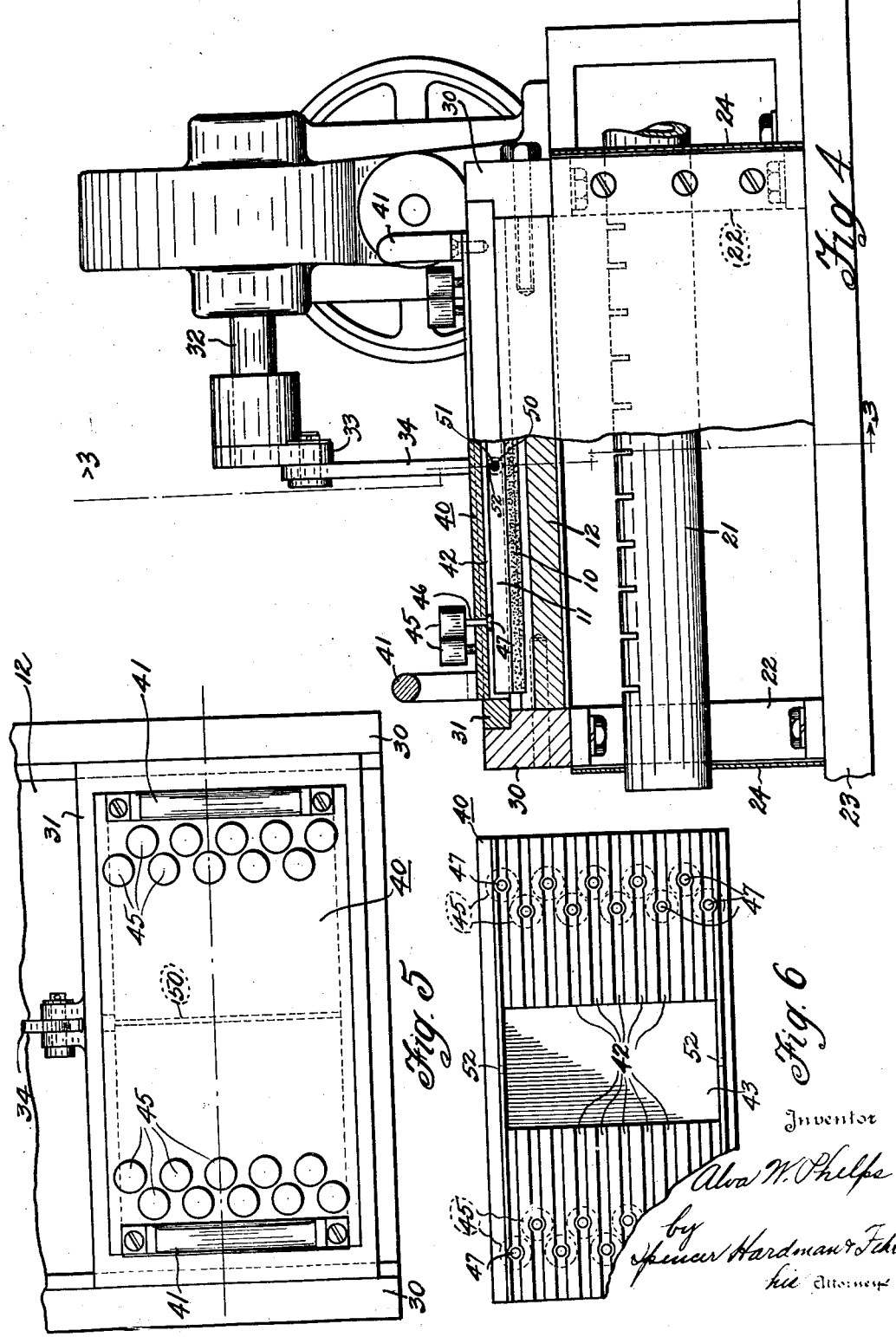

1,761,534

UNITED STATES PATENT OFFICE

ALVA W. PHELPS, OF ANDERSON, INDIANA, ASSIGNOR TO DELCO-REMY CORPORATION, OF ANDERSON, INDIANA, A CORPORATION OF DELAWARE

METHOD AND APPARATUS FOR MAKING RUBBER WIPER BLADES

Application filed March 20, 1929. Serial No. 348,647.

This invention relates to an apparatus and method of providing a straight wiping edge on flexible rubber wiping blades of windshield wipers and the like.

The general object of the invention is to provide flexible rubber wiping blades having a highly efficient wiping action on glass or the like, but presenting a minimum resistance to the movement of the blade. A more specific object is to provide an efficient and economical method of providing such a wiping blade by causing a relative movement between a heated solid surface and the wiping edge of the blade held in contact with the hot surface.

Further objects and advantages of the present invention will be apparent from the following description, reference being had to the accompanying drawings, wherein a preferred form of the embodiment of the present invention is clearly shown.

Figs. 1 and 2 are diagrammatic views illustrating on an enlarged scale the essential action of the method of this invention.

Fig. 3 is a longitudinal vertical section on line 3—3 of Fig. 4 through a power driven device for carrying out the method of this invention.

Fig. 4 shows on the right half thereof an end elevation viewed in direction of arrow 4ª of Fig. 3, and on the left half thereof a transverse section taken on the line 4ᵇ—4ᵇ of Fig. 3.

Fig. 5 is a fragmentary plan view of the right end of Fig. 3.

Fig. 6 is a bottom view of the detached reciprocating carrier of the wiper blades.

Similar reference characters refer to similar parts throughout the various drawings.

The essential action of the invention will be first described, as illustrated in Figs. 1 and 2. Numeral 10 designates the flexible rubber blade which is provided with a quite rigid metal back 11, preferably made of sheet metal bent into a U-section and then clamped upon the soft rubber strip. The soft rubber blades 10 are most economically made by shearing or otherwise cutting off strips of desired width from a sheet of properly vulcanized soft rubber.

It has been found that it is very difficult if not quite impossible to cut off such soft rubber blades with a good straight smooth wiping edge such as will provide an efficient wiping action but with only a small resistance to the motion of the blade.

This invention provides a simple method of straightening or smoothing out the wiping edge of such cut rubber blades so that they will wipe efficiently when held pressed against the wiped surface with a minimum force whereby the power necessary to actuate the wiper is materially reduced.

In Fig. 1 the blade is shown at 10' being moved laterally across the heated metal surface 12, the blade flexing opposite to the direction of motion so that the corner 13 of the wiping edge is being smoothed out by pressure contact with the hot surface 12. In Fig. 2 the motion of the blade 10' has been reversed and the opposite corner 14 is being similarly smoothed out. The temperature of the surface 12 is made such that the irregularities in the wiping edge are smoothed out by the rubber becoming slightly plastic due to the heat and friction and are therefore rapidly either worn away or burnished down smooth. Preferably the temperature is made such that the desired smoothing out action is accomplished after about 8 complete strokes of about four inches effective length. In practice it has been found that good results have been obtained by maintaining plate 12 at a temperature of about 500° F. and reciprocating the blade at a speed of about 8 strokes in 10 seconds. However other temperatures and speeds may be found desirable depending upon such variables as the composition of the rubber, the degree of vulcanization thereof, the thickness and stiffness of the flexible blade, and the size of the irregularities in the wiping edges which are required to be smoothed out.

In order to overcome the tendency of the rubber to adhere to the hot surface 12, a finely powdered substance such as soap-stone, mica, pumice, or the like, is preferably provided on the surface of plate 12, such as shown at 15 so that the motion of the rubber blade moves a small amount of such powder along over the hot surface immediately in front of the blade. In Figs. 1 and 2, the blades 10 dip into a reservoir of such powder 16 at the end of each stroke so that the small supply 15 may always be provided in front of the blade as it moves across surface 12. This powder is merely transferred from the reservoir 16 at one end to the reservoir at the other end by the motion of the blade, none being lost.

In Figs. 3 to 6 inclusive I have shown my preferred apparatus for carrying out the method illustrated in Figs. 1 and 2. In this device the plate 12, preferably of cast iron, forms the top of a small stove designated in its entirety by numeral 20, and heated by suitable means, such as the gas burner 21. Stove 20 is shown as built up from four standards 22 fixed to a base 23, and having sheet metal side and end walls 24 and preferably an interior lining of asbestos board 25 on all sides except under the hot plate 12.

Two guides rails 30 are suitably mounted on opposite sides of hot plate 12 and upon these guide rails there is reciprocated a carriage 31 by the power driven shaft 32, crank 33, and connecting rod 34. Detachably mounted upon carriage 31 is the wiper blade carrier 40 having two handles 41 by means of which carrier 40 may be quickly removed from or replaced within its recess within carriage 31.

Carrier 40 is provided with suitable means for holding a plurality of wiper blades 10 on edge in such relative position to the top of hot plate 12 that when carriage 31 is reciprocated upon its guide rails the rubber blades will receive the burnishing or smoothing out action described above in connection with Figs. 1 and 2. In the form illustrated, carrier 40 has a plurality of parallel slots 42 on its under side, each slot being adapted to receive a wiper blade 10 with an easy sliding fit. As shown in Fig. 6, the central portion of carrier 40 may be recessed on its under side as at 43 in order to facilitate the insertion or removal of blades 10 in the slots 42 with the fingers. At opposite ends of each slot 42 there is a small weight 45 having a shank 46 extending loosely through a small hole in carrier 40 and terminating in a small head 47 located in the slots 42 and centered therewith (see Figs. 4 and 6).

To insert the blades 10 into the carrier 40, the carrier is turned upside down as in Fig. 6 and a blade 10 inserted loosely within each slot 42, each blade bearing against two heads 47 of the weights 45. A pin 50 of small diameter, and having a loose fit within the central apertures 51 of wiper blades 10 (see Fig. 4) is then passed through the substantially aligned apertures 51 of the blades 10 and the two small vertical slots 52 in carrier 40 at opposite ends of pin 50 (see Figs. 3 and 6). It will now be clear that the blades 10 are held within the slots in carrier 40 but are capable of a small vertical movement therein due to a vertical sliding of pin 50 in slots 52 as well as due to the loose fit of pin 50 in the central apertures 51 in blades 10. Now when carrier 40 is turned upright and placed upon its carriage 31, the weights 45 will drop by gravity and move blades 10 to their lowermost position, as shown in Fig. 3. When in this position the tips of the blades contact with the powdered pumice 16 or the like, and hence upon reciprocation they drag a small amount of powder 16 across the surface of hot plate 12 from one powder reservoir to the other, back and forth.

The wiping edges of blades 10 are individually held in pressure contact with the hot plate 12 each by its two weights 45, and thus each blade is acted upon as if it were the only blade supported by the carrier, the individual relative movement of the blades being sufficient to permit this action.

After the desired number of strokes across the hot plate 12, for instance 10 strokes, the reciprocation is stopped, the carrier 40 lifted from the carriage 31, and the pin 50 pulled out whereupon all the blades 10 will fall from their slots 42. The carrier is then turned bottom up and refilled with other blades to be operated upon, as described in detail above.

While the form of embodiment of the present invention as herein disclosed, constitutes a preferred form, it is to be understood that other forms might be adopted, all coming within the scope of the claims which follow.

What is claimed is as follows:

1. The steps in the method of making rubber wiper blades comprising: cutting off strips from a sheet of flexible rubber and then providing a straight wiping edge on each strip by rubbing said wiping edge to and fro a number of strokes across a heated metal plate.

2. The steps in the method of making rubber wiper blades comprising: cutting off strips from a sheet of flexible rubber and then providing a straight wiping edge on each strip by rubbing said wiping edge to and fro a number of strokes across a heated metal plate, together with a small amount of powdered soapstone, or the like, to prevent the rubber sticking to said plate.

3. The steps in the method of making rubber wiper blades comprising: cutting off strips from a sheet of flexible rubber and then providing a straight wiping edge on each strip by rubbing said wiping edge laterally to and fro a number of strokes across a heated metal plate.

4. The steps in the method of making rubber wiper blades comprising: cutting off strips from a sheet of flexible rubber and then providing a straight wiping edge on each strip by rubbing said wiping edge to and fro a number of strokes, upon a hot surface heated to such a temperature as will smooth out the irregularities in said wiping edge.

5. The steps in the method of making rubber wiper blades comprising: cutting off strips from a sheet of flexible rubber and then providing a straight wiping edge on each strip by rubbing said wiping edge upon a heated metal surface.

6. The method of providing a straight wiping edge upon a flexible rubber wiping blade comprising: rubbing said wiping edge across a heated metal surface.

7. The method of providing a straight wiping edge upon a flexible rubber wiping blade comprising: rubbing said wiping edge across a heated metal surface, together with a powdered material used to prevent the rubber sticking to the metal surface.

8. The method of providing a straight wiping edge upon a flexible rubber wiping blade comprising: rubbing said wiping edge laterally in both directions, across a heated metal surface.

9. The method of providing a straight wiping edge upon a flexible rubber wiping blade comprising: rubbing said wiping edge laterally to and fro across a hot solid surface in such manner that the blade flexes oppositely to the direction of motion, whereby to cause rubbing contact chiefly at opposite corners of the wiping edge.

10. In an apparatus for providing efficient wiping edges on rubber wiping blades in combination, a hot metal surface, a carrier supporting a plurality of blades on edge, means permitting individual vertical movement of the blades relative to the carrier, means for moving said carrier over said hot surface to cause the wiping edges of said blades to be rubbed upon said hot surface, and means providing individual pressure contact between said edges and hot surface.

In testimony whereof I hereto affix my signature.

ALVA W. PHELPS.